United States Patent
Ono et al.

(10) Patent No.: US 8,360,014 B2
(45) Date of Patent: Jan. 29, 2013

(54) ENGINE HOUSING ENCLOSURE

(75) Inventors: Masaaki Ono, Osaka (JP); Toshiyuki Hayashi, Osaka (JP); Hirotoshi Kihara, Osaka (JP); Shojiro Matsumura, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 170 days.

(21) Appl. No.: 12/736,751

(22) PCT Filed: Apr. 24, 2009

(86) PCT No.: PCT/JP2009/058150
§ 371 (c)(1),
(2), (4) Date: Nov. 5, 2010

(87) PCT Pub. No.: WO2009/136556
PCT Pub. Date: Nov. 12, 2009

(65) Prior Publication Data
US 2011/0056453 A1  Mar. 10, 2011

(30) Foreign Application Priority Data
May 7, 2008 (JP) .................................. 2008-121529

(51) Int. Cl.
*F02B 63/04* (2006.01)
*F02B 63/00* (2006.01)

(52) U.S. Cl. .......................... 123/2; 123/41.12; 290/1 A

(58) Field of Classification Search ................... 123/2, 3, 123/41.01, 41.12, 41.15; 290/1 A, 1 B
See application file for complete search history.

(56) References Cited

FOREIGN PATENT DOCUMENTS

| JP | 01-253525 A | 10/1989 |
| JP | 07-151028 A | 6/1995 |
| JP | 08-268091 A | 10/1996 |
| JP | 2005-256641 A | 9/2005 |

OTHER PUBLICATIONS

International Search Report dated Aug. 4, 2009, issued for PCT/JP2009/058150.

*Primary Examiner* — Noah Kamen
(74) *Attorney, Agent, or Firm* — Edwards Wildman Palmer LLP; James E. Armstrong, IV; Stephen D. LeBarron

(57) ABSTRACT

In the context of an enclosure-housed engine in which an engine 10 is housed within an enclosure 2, the present invention is such that arranged in an intake chamber 8A, separate from one or more chambers where a radiator 18 and the engine are disposed, there is engine intake equipment comprising an air cleaner 22 and an intake silencer 23; the constitution being such that at least one wall face of said intake chamber is subjected to a cooling airstream, intake and exhaust of which are driven by a radiator fan; and the constitution being such that the radiator fan 19 is driven, regardless of whether or not engine coolant within the radiator is circulating, when outside air temperature is greater than or equal to a prescribed temperature.

2 Claims, 5 Drawing Sheets

ENGINE HOUSING ENCLOSURE

CROSS REFERENCE

This application claims under 35 U.S.C. §119(a) the benefit of Japanese Patent Application No. 2008-121529 filed May 7, 2008, the entire contents of which are incorporated herein by reference.

TECHNICAL FIELD

The present invention relates to enclosure(s) for a housing of engine(s), electric generator(s), waste heat recovery device(s) and/or other such equipment that may be employed in cogeneration apparatus(es).

BACKGROUND ART

Conventionally engine intake equipment includes an air cleaner and an intake silencer that are arranged in a chamber separate from a chamber in which an engine is disposed. More specifically, an intake silencer also serves as a fan shroud inasmuch as it is disposed peripherally about the radiator fan (see, for example, Patent Reference No. 1).
PATENT REFERENCE NO. 1: Japanese Patent Application Publication Kokai No. H07[1995]-151028

SUMMARY OF INVENTION

Problem to be Solved by Invention

In the prior art reference, because the intake silencer includes a fan shroud, it is difficult to use the intake silencer with other models.

Furthermore, it is not preferred to use engine intake equipment under conditions where high temperatures prevail. For example, in a cogeneration apparatus that employs a gas engine, gas fuel and air are combined at a mixer, and the gas mixture is thereafter supplied to the engine. Because high temperature air will result in reduced density, this prevents a sufficient supply of air to the engine and results in a reduction in engine performance.

In particular, because cogeneration apparatuses include an engine, electric generator, radiator, intake equipment, exhaust equipment, and other such components that are housed internally within an enclosure, it is necessary to prevent the air cleaner and the intake silencer from being subjected to high temperatures due to the heat produced during operation.

The present application addresses the problem of preventing engine intake equipment that includes air cleaner(s) and intake silencer(s) from being subjected to high temperature, and in addition, allows the intake silencer to be used along with other models.

Means for Solving Problem

The present invention, being conceived in order to solve the aforesaid problems, is an enclosure for housing an engine wherein, arranged in an intake chamber, separate from one or more chambers where a radiator and an engine are disposed, there is engine intake equipment comprising an air cleaner and an intake silencer. The radiator and a radiator fan are arranged in a radiator chamber, separate from the chamber where the engine is disposed. In particular, the intake chamber is adjacent to the aforesaid radiator chamber and at least one wall face of the intake chamber is subjected to a cooling airstream, intake and exhaust of which are driven by the radiator fan. Furthermore, a liquid-liquid heat exchanger that extracts heat from engine coolant to the exterior is arranged in one or more spaces other than the aforesaid radiator chamber and the aforesaid intake chamber. The radiator fan in the illustrative embodiment of the present invention is driven, regardless of whether or not engine coolant within the radiator is circulating, when an engine intake air temperature is greater than or equal to a prescribed temperature, even when the engine coolant bypasses the radiator and flow into only the liquid-liquid heat exchanger.

Note that when an engine intake air temperature is greater than or equal to a prescribed temperature, the intake air density is less than or equal to a prescribed value as calculated based on the temperature of air within the air cleaner, intake chamber temperature, radiator chamber temperature, enclosure ambient temperature, and/or amount of fuel supplied (e.g., degree to which gas fuel supply valve is open), In the aforesaid present invention, the radiator fan is driven when the engine intake air temperature is greater than or equal to a prescribed temperature, even when engine coolant is not circulating within the radiator. At such time, the at least one wall face of the intake chamber at which an air cleaner and an intake silencer are arranged is subjected to a cooling airstream produced by a radiator fan, making it possible to prevent propagation of heat from the radiator chamber to the intake chamber by way of the one wall face. Simultaneous therewith, because driving of the radiator fan causes the radiator chamber to have a greater negative pressure than at the intake chamber, which is maintained at negative pressure while the engine is operating, leakage of high-temperature air from the radiator chamber to the intake chamber can be eliminated, making it possible to prevent flow of heat thereinto.

Furthermore, when temperature within the intake chamber is high, it is also possible to cause heat within the intake chamber to escape to the radiator chamber by way of the one wall face. As a result, it is possible to suppress any increase in temperature of engine intake equipment and it is possible to prevent reduction in engine intake efficiency.

Furthermore, it is possible to make the intake silencer as independent equipment and thus use it with different models.

Moreover, in the present invention, an exhaust silencer is arranged in an exhaust chamber that is separate from the intake chamber and from the chamber or chambers where the engine and the radiator are disposed.

In the aforesaid present invention, because the exhaust silencer is isolated from the intake silencer and the air cleaner, it is possible to prevent transfer of engine waste heat to such equipment.

Advantageously, because the radiator fan is driven when an engine intake air temperature is greater than or equal to a prescribed temperature even when engine coolant is not circulating within the radiator, it is possible to suppress any increase in temperature of engine intake equipment and to prevent reduction in engine intake efficiency. Furthermore, because it is possible to make the intake silencer as an independent piece of equipment, the silencer is able to be used in other models.

BRIEF DESCRIPTION OF DRAWINGS

FIG. 4 is a sectional view showing in schematic fashion an intake chamber and a radiator chamber in same cogeneration apparatus, (a) being a front view of the situation that exists when the radiator fan is turned off, and (b) being a front view of the situation that exists when the radiator fan is turned on.

DETAILED DESCRIPTION

Below, embodiments of the present invention are described with reference to the drawings.

The illustrative embodiment of the present invention described below is applied to a cogeneration apparatus 1. Note that the cogeneration apparatus 1 refers to a system, where a commercial electric power subsystem of an external commercial power supply and an electric power generation subsystem of an electric generator are connected to an electric power delivery subsystem that delivers electric power to electric power consuming equipment (load), that meets the electric power demand of said load, that recovers waste heat generated in accompaniment to electric power generation, and that utilizes said recovered heat.

Figure 1:
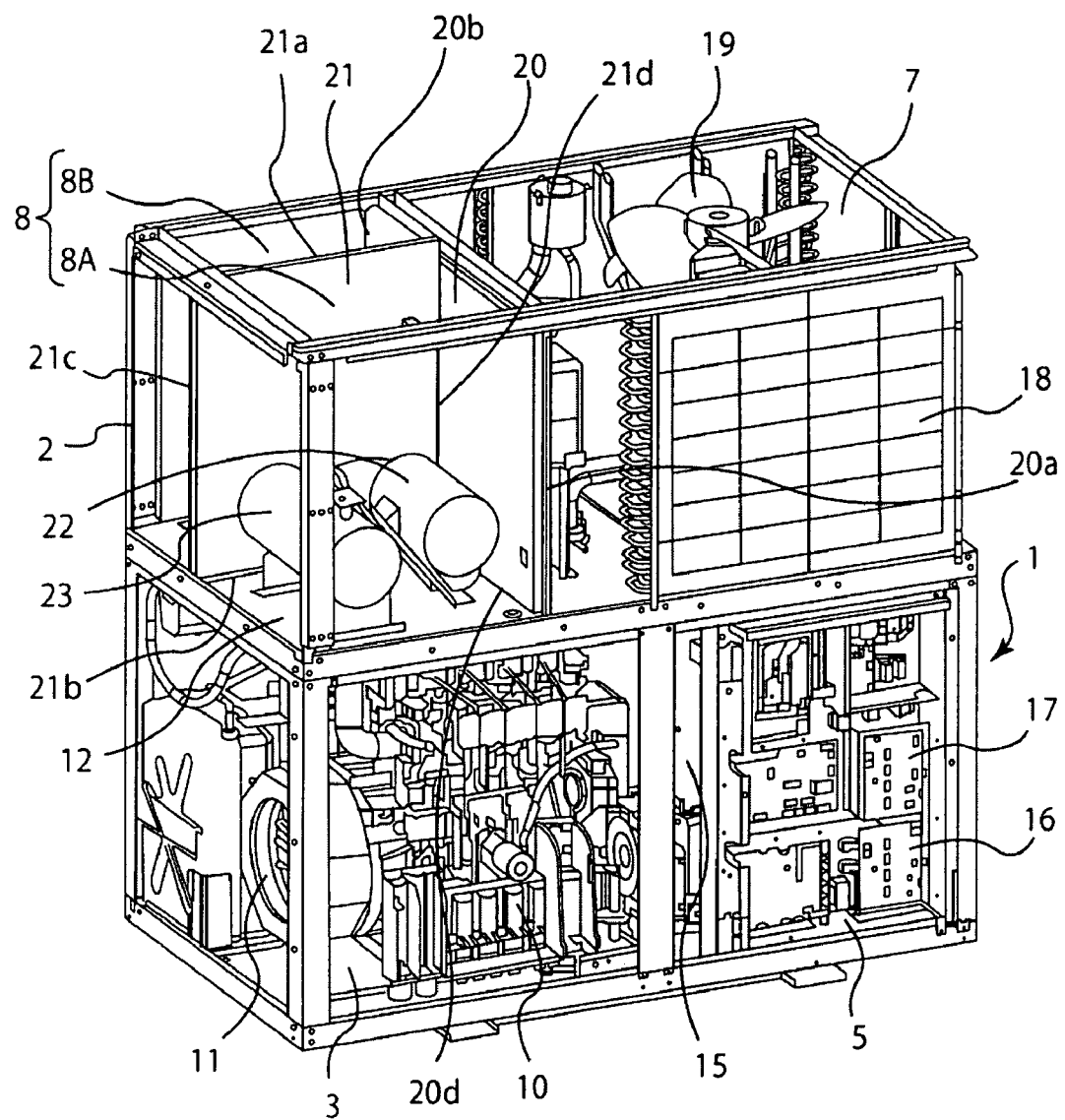
FIG. 1 is a front perspective view showing the entirety of a cogeneration apparatus associated with one embodiment of the present invention.
Figure 2:
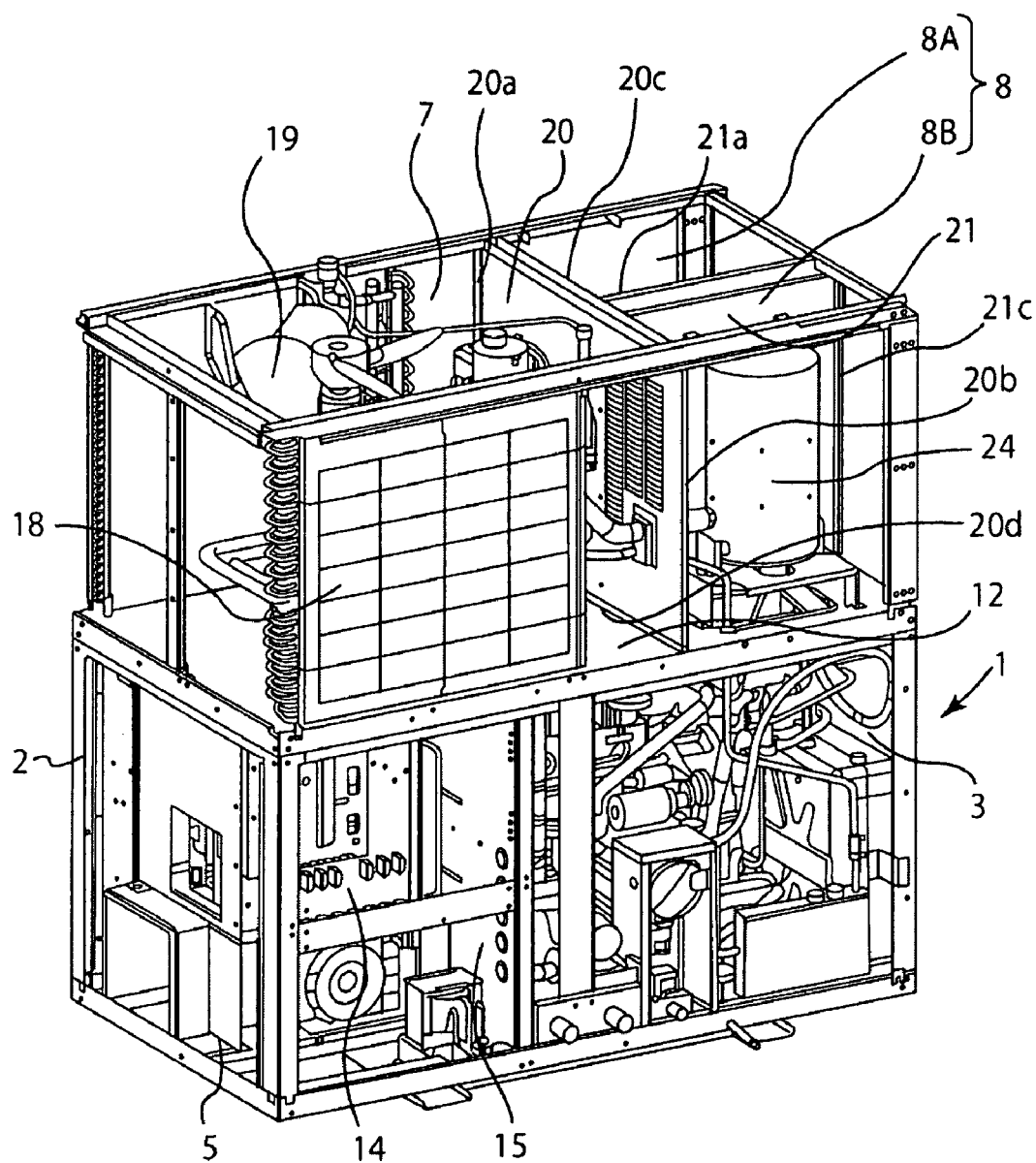
FIG. 2 is a rear perspective view showing the entirety of same cogeneration apparatus.

FIG. 1 illustrates a front perspective view of a cogeneration apparatus, and FIG. 2 shows a rear perspective view of same apparatus. As shown in FIG. 1 and FIG. 2, the cogeneration apparatus 1 associated with the exemplary embodiment is equipped with the enclosure 2, serving as case, which is formed in roughly rectangular parallelepiped fashion. The interior of this enclosure 2 is divided vertically into two regions by the intermediate wall 12 located approximately midway in the vertical direction of the enclosure 2, the lower region includes the engine chamber 3 and the equipment housing chamber 5, and the upper region includes the radiator chamber 7 and the intake/exhaust chamber 8.

The aforesaid engine chamber 3 is disposed to one side in the lengthwise direction of the enclosure 2. Arranged within this engine chamber 3 is an engine 10, an electric generator 11 driven by this engine 10, and various items including a coolant pump, an exhaust gas heat exchanger, and a liquid-liquid heat exchanger which are not shown in the drawings. Note that a gas engine may for example be employed as the engine 10, wherein gas fuel and air being combined at a mixer to allow it to operate. In addition, rotation of said engine 10 may be configured to cause electric generator 11, provided in an operably linked fashion with respect to said engine 10, to be driven in linked accompaniment with respect thereto.

The aforesaid equipment housing chamber 5 is arranged to the side (right side as shown in FIG. 1) of the engine chamber 3. This equipment housing chamber 5 is partitioned from the engine chamber 3 by partition 15. Arranged within the equipment housing chamber 5 is an inverter 14 and a control box 17 equipped with a control apparatus 16 for controlling liquid-liquid heat exchanger equipment and engine drive equipment.

Figure 3:
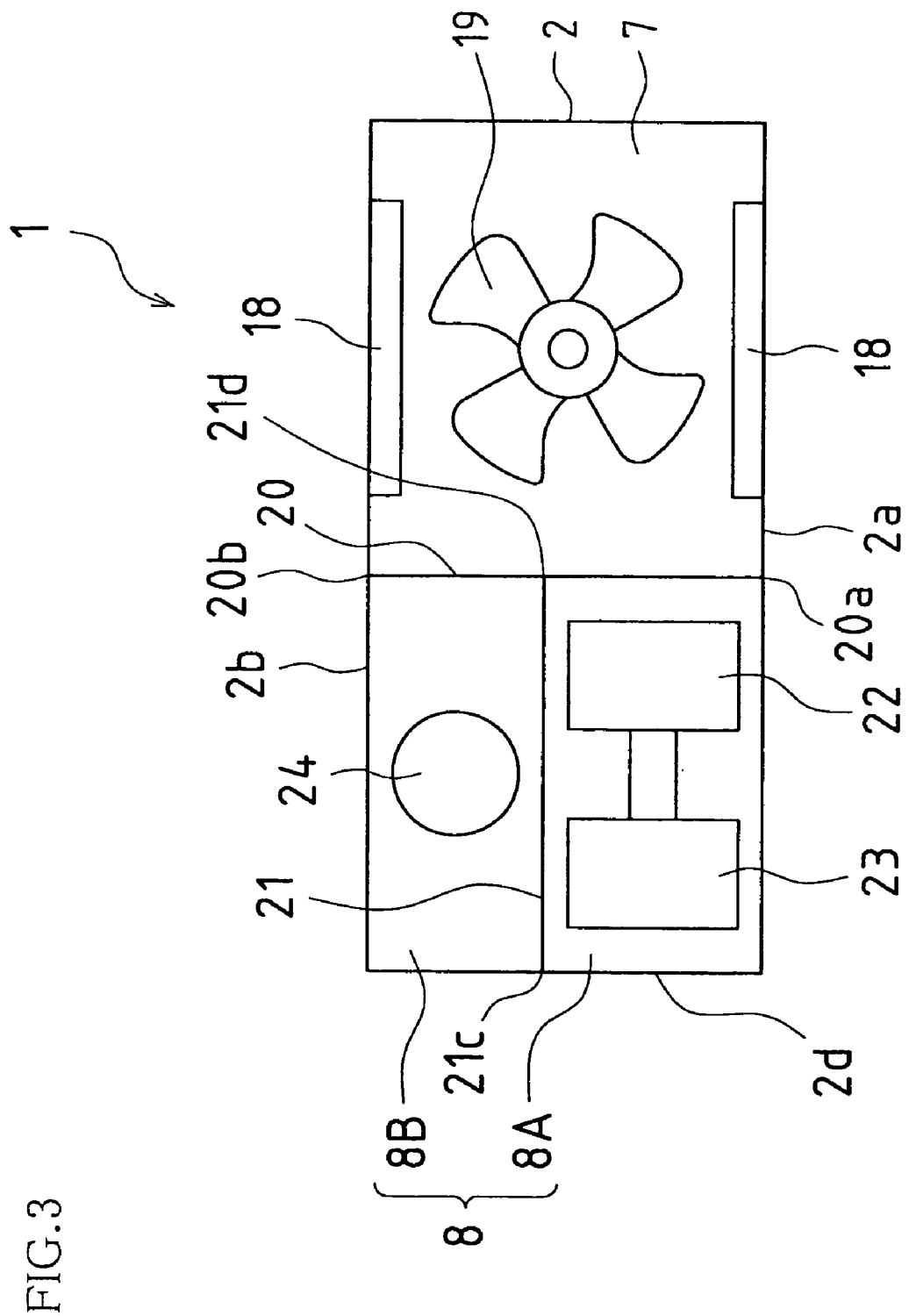
FIG. 3 is a plan view showing same cogeneration apparatus in schematic fashion.
Figure 4:
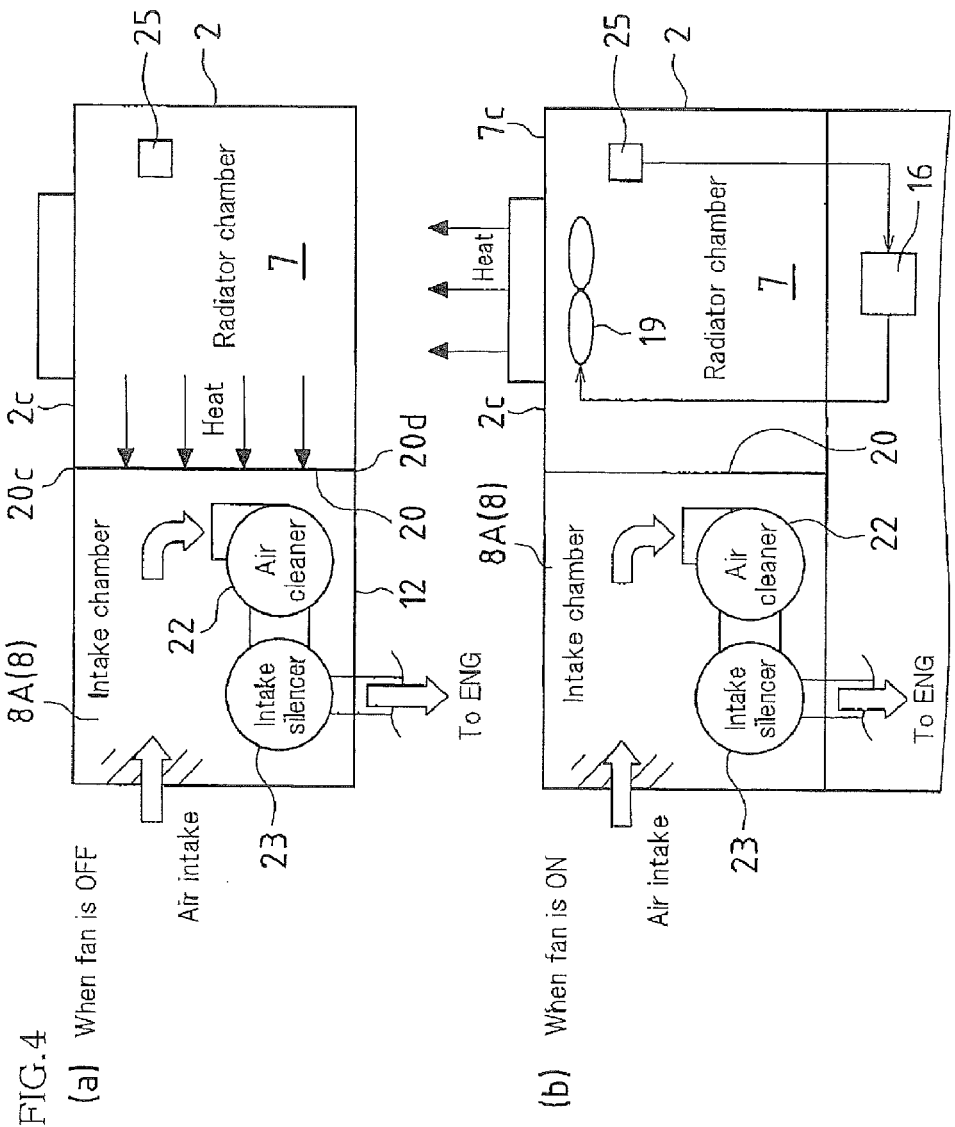

The aforesaid radiator chamber 7 is arranged above the equipment housing chamber 5, being disposed within enclosure 2 diagonally from the engine chamber 3 (diagonally thereabove). As shown in FIG. 3 and FIG. 4, the radiator 18 is respectively arranged at the front and back of the radiator chamber 7, and the heat-dissipating radiator fan 19, controlled by the control apparatus 16, is arranged in the upper portion of the radiator chamber 7.

The radiator chamber 7 and the intake/exhaust chamber 8 may be partitioned by a partition 20, which may be made of, for example, sheet metal. That is, the front and back edges 20a, 20b of partition 20 are connected to front and back walls 2a, 2b of the enclosure 2. The top edge 20c of the partition 20 is connected to the roof 2c of the enclosure 2, and the bottom edge 20d is connected to the intermediate wall 12.

Moreover, intake/exhaust chamber 8 is partitioned into an intake chamber 8A and an exhaust chamber 8B by a partition 21, which may be made of, for example, of sheet metal. Specifically, the partition 21 is arranged midway in the front-to-back direction of the intake/exhaust chamber 8. More specifically, the intake chamber 8A is disposed on the front side thereof, and the exhaust chamber 8B is disposed on the back side thereof. The top edge 21a of the partition 21 is connected to the roof 2c of the enclosure 2, and the bottom edge 21b is connected to the intermediate wall 12. The edge 21c on one side of the partition 21 is connected to a wall on one side of the enclosure 2, and the edge 21d at the other side thereof is connected in a T-shaped fashion to the aforesaid partition 20.

Furthermore, a louvered portion is provided at the exhaust chamber 8B side of the partition 20 as shown in FIG. 2. In particular, a ventilation hole for the engine chamber 3 is provided at a location in intermediate wall 12 corresponding to the floor of the exhaust chamber 8B, such that the ventilating airstream from the engine chamber flows from the aforesaid ventilation hole, past the exhaust chamber 8B and the louvered portion of the partition 20, and into the radiator chamber 7.

However, at the partition 21, since there is nothing corresponding to a vent hole, flow of air between the intake chamber 8A and exhaust chamber 8B is blocked. That is, the flow of air is blocked between the intake chamber 8A and the exhaust chamber 8B so that any cross flow between the two is so minimal that it does not affect the temperature of the other.

Respectively arranged at the intake chamber 8A are an air cleaner 22 and an intake silencer 23. Arranged in the exhaust chamber 8B is an exhaust silencer 24.

Provided at the aforesaid radiator chamber 7 is a temperature sensor (sensor) 25 that is configured to detect the temperature within the radiator chamber 7. By virtue of a signal from this sensor 25, in the event that it is determined that temperature within the radiator chamber 7 is greater than or equal to setpoint temperature, the control apparatus 16 cotnrols the radiator fan 19 to be driven, regardless of whether or not engine coolant within the radiator 18 is circulating. That is, not only when engine coolant is circulating within the radiator 18 but even when engine coolant is not circulating within the radiator 18, the control apparatus 16 controls the radiator fan 19 to be driven when temperature within the radiator chamber 7 is greater than or equal to setpoint temperature.

The operation of the cogeneration apparatus 1 of the exemplary embodiment having the foregoing structure will now be described.

First, fuel is supplied to a mixer, not shown, that is connected to the engine 10. Furthermore, air that has been sucked into the intake chamber 8A is supplied to the mixer by way of the air cleaner 22 and the intake silencer 23. Exhaust gas exiting the engine 10 passes through an exhaust gas heat exchanger and is silenced by the exhaust silencer 24, and is thereafter discharged to the exterior from the top of the enclosure 2.

In the event that coolant temperature as detected at a thermostat is greater than or equal to a setpoint temperature, engine coolant that has cooled the engine 10 is delivered to a liquid-liquid heat exchanger, not shown. Furthermore, heat from engine coolant is extracted to the exterior by way of the liquid-liquid heat exchanger. Engine coolant that has passed through the liquid-liquid heat exchanger is returned to the engine 10. Note that the coolant circuit of the exemplary embodiment is such that the liquid-liquid heat exchanger and radiator 18 are arranged in series, engine coolant being delivered to the radiator 18 when the amount of heat exchange present in the liquid-liquid heat exchanger is low. At this time, the radiator fan 19 is driven and heat from engine coolant is dissipated.

When engine coolant within the radiator 18 is cooled by the radiator fan 19, the temperature within the radiator chamber 7 increases due to dissipation of heat from the radiator 18.

However, when the amount of heat exchange occurring in the liquid-liquid heat exchanger is large, the engine coolant bypasses the radiator 18 and is returned to the engine 10. Accordingly, in such case, there is no need to operate the radiator fan 19 to cool the engine coolant circulating within the radiator 18. Nonetheless, the chamber temperature of the radiator chamber 7 increases due to the high-temperature ventilating airstream from the engine chamber 3 that is exhausted from the radiator chamber 7 by way of the exhaust chamber 8B, thermal conduction from the intermediate wall 12 of heat dissipated from the engine 10, heat dissipated from the exhaust silencer 24 and the exhaust tubing, and the high-temperature engine coolant remaining within the radiator 18.

The sensor 25 may be configured to detect the temperature within the radiator chamber 7, and send signals to control apparatus 16. At the control apparatus 16, if, based on the signal from sensor 25, a temperature is greater than or equal to a setpoint temperature, the control apparatus 16 determines whether an engine intake air temperature is greater than or equal to a prescribed temperature, and the radiator fan 19 is driven regardless of whether or not the engine coolant is circulating within the radiator 18. In the exemplary embodiment, the radiator chamber 7 and the intake chamber 8A are mutually adjacent with the partition 20 intervening therebetween. Accordingly, a high chamber temperature within the radiator chamber 7 will result in heat transfer from the radiator chamber 7 to the intake chamber 8A due to thermal conduction from the partition 20A. Furthermore, when the radiator fan 19 is stopped while the engine 10 is operating, the fact that the intake chamber 8A has a negative pressure while the radiator chamber 7 has a positive pressure may cause air to leak from the radiator chamber 7 into the intake chamber 8A. Thus, when there is a high chamber temperature within the radiator chamber 7, this leakage of high-temperature air will also result in heat transfer from the radiator chamber 7 to the intake chamber 8A. Because of these effects, when the chamber temperature at the radiator chamber 7 is high, there is a tendency for the chamber temperature at the intake chamber 8A to also be high and for the engine intake air density to decrease, such that the effective intake rate is reduced and the intake efficiency of the engine 10 is lowered. Note that besides the chamber temperature within the radiator chamber 7, it is also possible to detect the temperature within ventilation duct(s) for the engine chamber 3 and/or detect the chamber temperature within the intake chamber 8A to determine when an engine intake air temperature is greater than or equal to a prescribed temperature, or it is also possible to determine this without detection of temperature but instead based on the degree to which the gas fuel supply valve is open.

More specifically, driving the radiator fan 19 causes ventilation of the interior of the radiator chamber 7 and dissipation of heat therefrom. The partition 20, which partitions the radiator chamber 7 and the intake chamber 8A, is subjected to a cooling airstream(s), intake and exhaust of which are driven by the radiator fan 19, making it possible to prevent an increase in the temperature of the partition 20. Simultaneous therewith, the radiator chamber 7 has a negative pressure, eliminating leakage of air into the intake chamber 8A, and making it possible to prevent an increase in the temperature of the intake chamber 8A due to heat transfer from the radiator chamber 7. As a result, it is possible to suppress an increase in temperature at the air cleaner 22 and the intake silencer 23, and it is also possible to prevent a reduction in intake efficiency of the engine 10.

Furthermore, while passage of exhaust gas through exhaust silencer 24 does heat the exhaust silencer 24, because the exhaust silencer 24 is arranged in the exhaust chamber 8B and is isolated from the air cleaner 22 and the intake silencer 23, it is possible to prevent the transfer of engine waste heat to such equipment (e.g., the air cleaner 22 and the intake silencer 23).

Furthermore, because the intake silencer 23 is independently arranged within the intake chamber 8A, the intake silencer 23 is capable of being used in different models.

Figure 5:
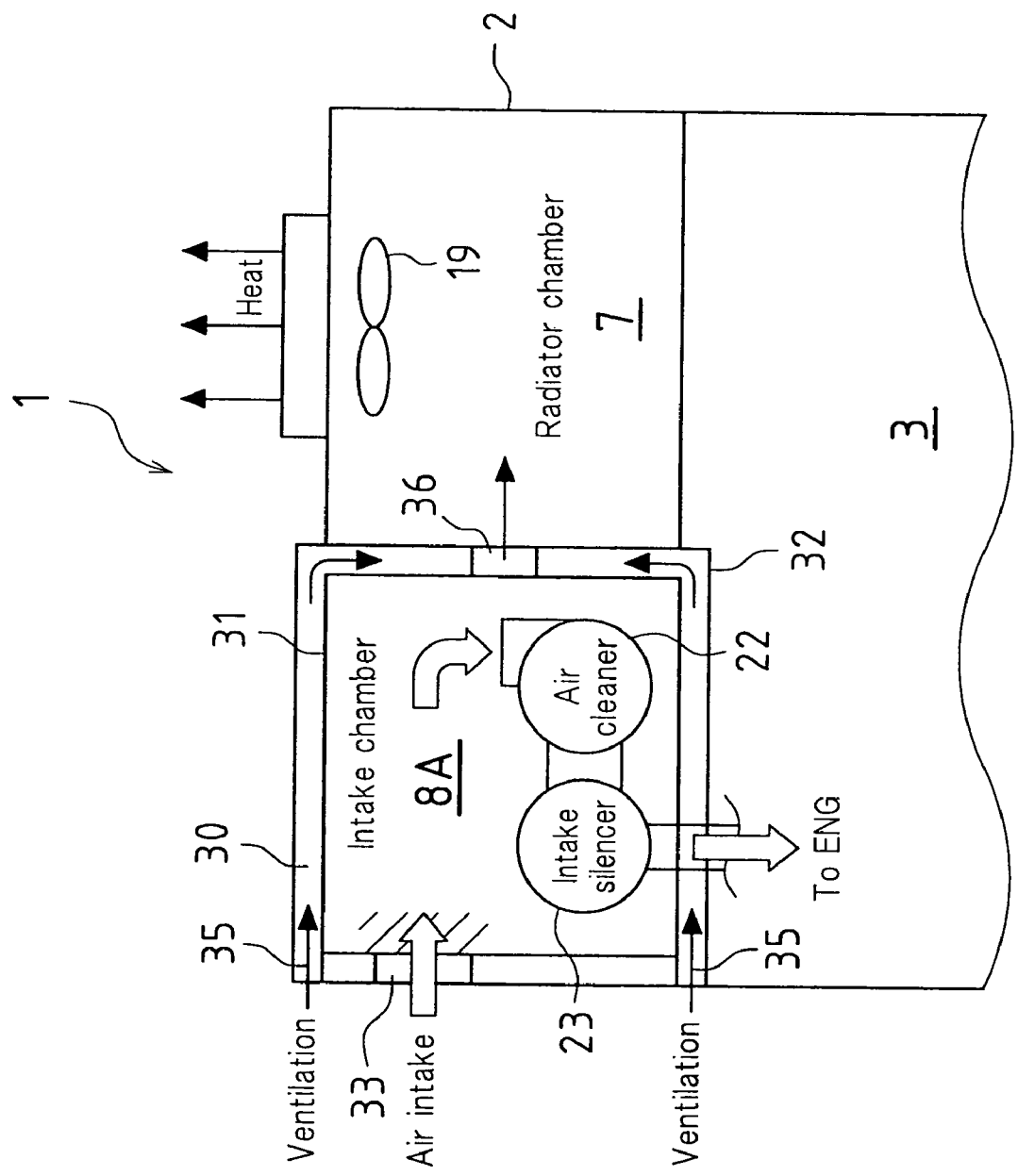
FIG. 5 is a front sectional view showing in schematic fashion an intake chamber and a radiator chamber associated with another embodiment of the present invention.

FIG. 5 illustrates another exemplary embodiment of the present invention. In particular, ventilation ducts 30 include air passages that are formed peripherally about the intake chamber 8A to prevent heat transfer from the radiator chamber 7 to the intake chamber 8A. More specifically, arranged around the outside and at a prescribed distance from an inner wall 31, which forms the intake chamber 8A, is an outer wall 32. The ventilation ducts 30 are formed between these inner and outer walls 31, 32. While it is preferred that the outer wall 32 be provided at the top, bottom, front, back, and left and right faces of the inner wall 31, it may be provided at any desired orientation.

Furthermore, formed at the inner and outer walls 31, 32 is an intake port 33, which communicates with the intake chamber 8A. Moreover, at the outer wall 32, a plurality of ventilation holes 35, which communicate with the ventilation ducts 30, are formed, and in addition, an exhaust port 36, which communicates with the radiator chamber 7, is formed.

In accordance with the illustrative embodiment of the present invention, outside air enters the intake chamber 8A via the intake port 33. When the radiator fan 19 is actuated, ventilation of air from the interior of the radiator chamber 7 causes outside air to flow from the ventilation holes 35, along the ventilation ducts 30, through the exhaust port 36, and into the radiator chamber 7. By subjecting the inner wall 31 to such cooling airstream(s) produced by the intake and exhaust of the radiator fan 19, it is possible to prevent heat transfer from adjacent compartment(s) such as the radiator chamber 7, the engine chamber 3, and the exhaust chamber 8B into the intake chamber 8A.

The present invention is not limited to the foregoing embodiment. For example, it is possible to provide the sensor 25 in a location other than the radiator chamber 7 as has been described above. Alternatively, it is also possible to determine whether or not an engine intake air temperature is greater than or equal to a prescribed temperature without detection of temperature from this sensor.

Furthermore, it is also possible to employ the present invention in a GHP (gas heat pump).

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are, moreover, within the scope of the present invention.

POTENTIAL INDUSTRIAL USE

The present invention is effective as an enclosure for housing an engine and engine intake equipment; and is particularly suited to use in an enclosure-housed cogeneration apparatus or GHP (gas heat pump) that houses engine(s), electric generator(s), waste heat recovery device(s) and/or other such equipment.

EXPLANATION OF REFERENCE NUMERALS

1 Cogeneration apparatus
2 Enclosure
3 Engine chamber
5 Equipment housing chamber
7 Radiator chamber
8 Intake/exhaust chamber
8A Intake chamber
8B Exhaust chamber
10 Engine
11 Electric generator
14 Inverter
16 Control apparatus
17 Control box
18 Radiator
19 Radiator fan
22 Air cleaner
23 Intake silencer
24 Exhaust silencer
25 Sensor

The invention claimed is:

1. An enclosure for housing an engine, the enclosure comprising:
 an intake chamber, separate from one or more chambers where a radiator and an engine are disposed, including engine intake equipment arranged therein, the engine intake equipment including an air cleaner and an intake silencer;
 a radiator chamber, separate from the chamber where the engine is disposed, including the radiator and a radiator fan, wherein the intake chamber is adjacent to the radiator chamber to cause at least one wall face of the intake chamber to be subjected to a cooling airstream, intake and exhaust of which is driven by the radiator fan; and
 one or more spaces other than the radiator chamber and the intake chamber including a liquid-liquid heat exchanger that extracts heat from engine coolant to the exterior, wherein control means operates the radiator fan to be driven, regardless of whether or not engine coolant within the radiator is circulating, when an engine intake air temperature is greater than or equal to a prescribed temperature, even when the engine coolant bypasses the radiator and flows into only the liquid-liquid heat exchanger.

2. An engine housing enclosure according to claim 1, the engine housing enclosure being characterized in that an exhaust silencer is arranged in an exhaust chamber that is separate from the intake chamber and from the chamber or chambers where the engine and the radiator are disposed.

* * * * *